United States Patent
Liu

(10) Patent No.: US 7,258,219 B2
(45) Date of Patent: Aug. 21, 2007

(54) PLANETARY GEAR ACTUATOR APPARATUS AND METHOD

(75) Inventor: Jintao Liu, Windsor (CA)

(73) Assignee: L&P Property Management Company, South Gate, CA (US)

( * ) Notice: Subject to any disclaimer, the term of this patent is extended or adjusted under 35 U.S.C. 154(b) by 189 days.

(21) Appl. No.: 11/154,127

(22) Filed: Jun. 16, 2005

(65) Prior Publication Data

US 2005/0245348 A1 Nov. 3, 2005

(51) Int. Cl.
*F16D 67/02* (2006.01)
(52) U.S. Cl. ............... 192/223.4; 192/21 S; 192/81 C
(58) Field of Classification Search ............ None
See application file for complete search history.

(56) References Cited

U.S. PATENT DOCUMENTS

| | | | | |
|---|---|---|---|---|
| 3,562,851 A | | 2/1971 | Koller ..................... 16/140 |
| 3,893,206 A | | 7/1975 | Pickles et al. ............. 16/144 |
| 4,172,568 A | | 10/1979 | Yamanashi et al. ...... 242/107.6 |
| 4,533,027 A | * | 8/1985 | Otani et al. ............. 192/223.4 |
| 4,715,655 A | | 12/1987 | Katsumoto et al. ........ 297/362 |
| 5,524,970 A | | 6/1996 | Kienke et al. ............. 297/362 |
| 5,681,005 A | * | 10/1997 | Ligon et al. ............. 242/394.1 |
| 5,685,611 A | | 11/1997 | Eguchi et al. ............ 297/367 |
| 6,325,457 B1 | | 12/2001 | Matsumoto et al. ........ 297/366 |
| 6,364,414 B1 | | 4/2002 | Specht ..................... 297/410 |
| 6,877,597 B2 | * | 4/2005 | Bach et al. .............. 192/223.4 |

* cited by examiner

*Primary Examiner*—Saul Rodriguez
(74) *Attorney, Agent, or Firm*—Husch & Eppenberger, LLC; Grant D. Kang

(57) ABSTRACT

A traction cable actuator has a sun gear, with a lever, at least two planetary gears engaged with the sun gear, and a housing with a toothed race engaging the planetary gears. The housing further has a lock spring seat, and a traction cable sleeve seat. A drive shaft operatively engages with the sun gear to turn the sun gear. The shaft has at least one release tab. A pulley is disposed within the housing. The pulley has planetary gear axles disposed to receive driving force from the planetary gears. The pulley also has a traction cable wire seat. A lock spring disposed to engage said lock spring seat in the housing engages the lever on the sun gear when the sun gear is turned. The lock spring holds said pulley in a position selected by turning the drive shaft. A bearing and groove stop assembly may be included.

20 Claims, 6 Drawing Sheets

PLANETARY GEAR ACTUATOR APPARATUS AND METHOD

CROSS-REFERENCE TO RELATED APPLICATIONS

This application is a continuation of U.S. application Ser. No. 10/765,353, filed Jan. 27, 2004, now Pat. No. 6,997,847, issued Feb. 14, 2006.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention is in the field of mechanical actuators for traction cables, especially as applied to the control of ergonomic supports in seating, particularly automobile seats.

2. Related Art

Ergonomic supports for seats, such as automobile seats, need to be adjustable. Movement of the internal components of ergonomic supports, such as lumbar supports, is often made by applying traction to a traction cable such as Bowden cable. The ergonomic supports frequently require the application of traction under some tension to overcome a static bias of a component and/or the weight of the seat occupant, in order to bring the moving parts into an ergonomically weight supporting position for the comfort of the passenger.

Traction cables such as Bowden cables are typically comprised of a wire that slides axially through a sleeve. At the lumbar support, the wire will be attached to one portion of a stamped metal or molded plastic pressure surface that is mounted to arch into a supporting position when traction is applied to one or both of its ends. The traction cable sleeve is attached to another portion of the pressure surface, or the mount, to apply the traction. See U.S. Pat. No. 6,254,187, incorporated by reference herein, for examples, of such components. Other components may slide in and out of a channel in a housing, with the sliding being powered by the application of traction through the Bowden cable wire. In such devices, the wire is attached to the moving portion and the sleeve to a housing or mount. See U.S. Pat. No. 6,619,739, incorporated by reference herein, for an example of these components. The present invention may be applied to any moving parts that may be actuated by a traction cable.

The mounting of the traction cable on the components of the ergonomic device require that the Bowden cable sleeve end be fixed to a portion of the ergonomic support and the end of the wire that slides through the sleeve be attached to another portion of the ergonomic support. An actuation device mounted at the other end of the traction cable must be able to apply traction to pull the wire through and from the sleeve and also must be able to hold the wire at a selected position along its axial travel relative to the sleeve, in order to thereby hold the connected ergonomic support in a position selected by the user.

Power actuators typically achieve these necessary functions by holding the sleeve end in a fixed position and attaching the wire end to a moving part in order to draw it from the sleeve. In some actuators the moving part is an axially translating lead screw, see U.S. patent application Ser. No. 10/008,896, incorporated by reference herein. In other actuators the moving part is a pulley having a seat for a wire end bullet. Turning the pulley thereby pulls the wire from the sleeve.

In addition to the necessary functions recited above, there is a variety of traits that are desirable in the marketplace for actuators that apply traction manually. Among these are ease of use and a perception by the user that the components move smoothly.

Planetary gears applied to other applications are known. The equilateral symmetry of the drive train is desirable for its mechanical advantage, which promotes ease of use, and for its smooth application of power.

However, the planetary gear itself would not be capable of holding a selected position against the tension applied to the traction cable by use of the ergonomic support it is used to actuate.

There is a need in the art for a smooth, easy to operate planetary gear mechanical actuator that is capable of holding a selected position. As always, there is a continuing need in the art to produce components that are durable and economical.

SUMMARY OF THE INVENTION

It is in view of the above problems that the present invention was developed. The present invention is a planetary gear mechanical actuator for a traction cable having a locking spring.

A traction cable sleeve is mounted in a stationary position in a housing. The traction cable wire extends from the sleeve and into the housing where it is seated on a pulley. The pulley is rotated by a planetary gear assembly.

A sun gear includes a fixed tab, flange or lever. A drive shaft turns the sun gear. The drive shaft also has a tab or boss disposed to articulate with the sun gear flange or lever. The housing has a seat for a locking spring. The ends of the spring are disposed against the lever or flange of the sun gear such that turning the sun gear expands the spring. Expansion of the spring engages a spring seat in the housing in a friction fit, locking the actuator and ergonomic support in a selected position. The tabs on the drive shaft are disposed adjacent to the spring ends in order to compress the spring and release the friction lock when the actuator is turned in a reverse direction.

In one embodiment, the locking spring is a circular spring coaxial with the sun gear.

In one embodiment, a bearing and groove assembly provide a positive stop to prevent overloading components at the end of a range of travel Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
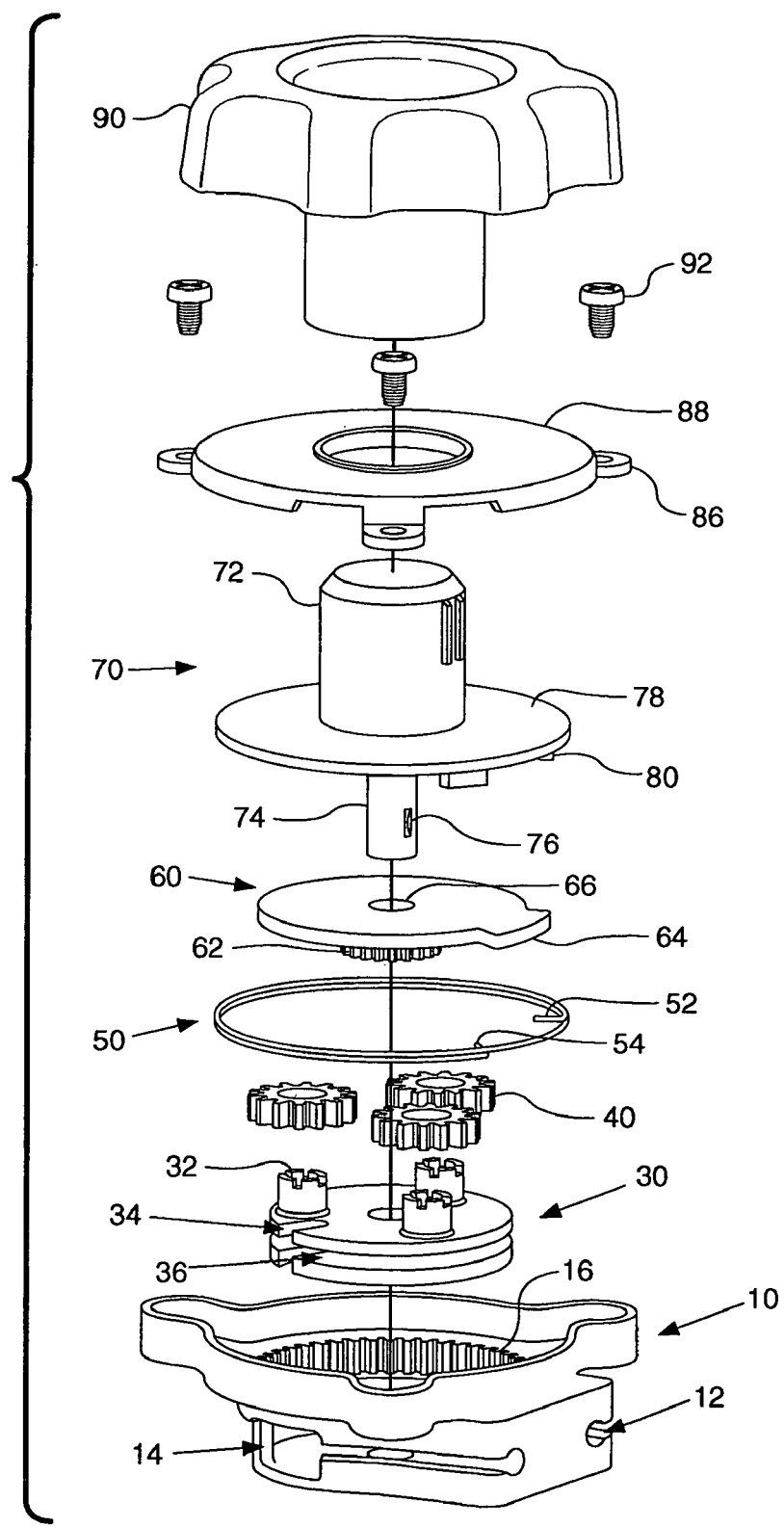
FIG. 1 is an exploded perspective view of the planetary gear manual actuator of the present invention.
Figure 2:
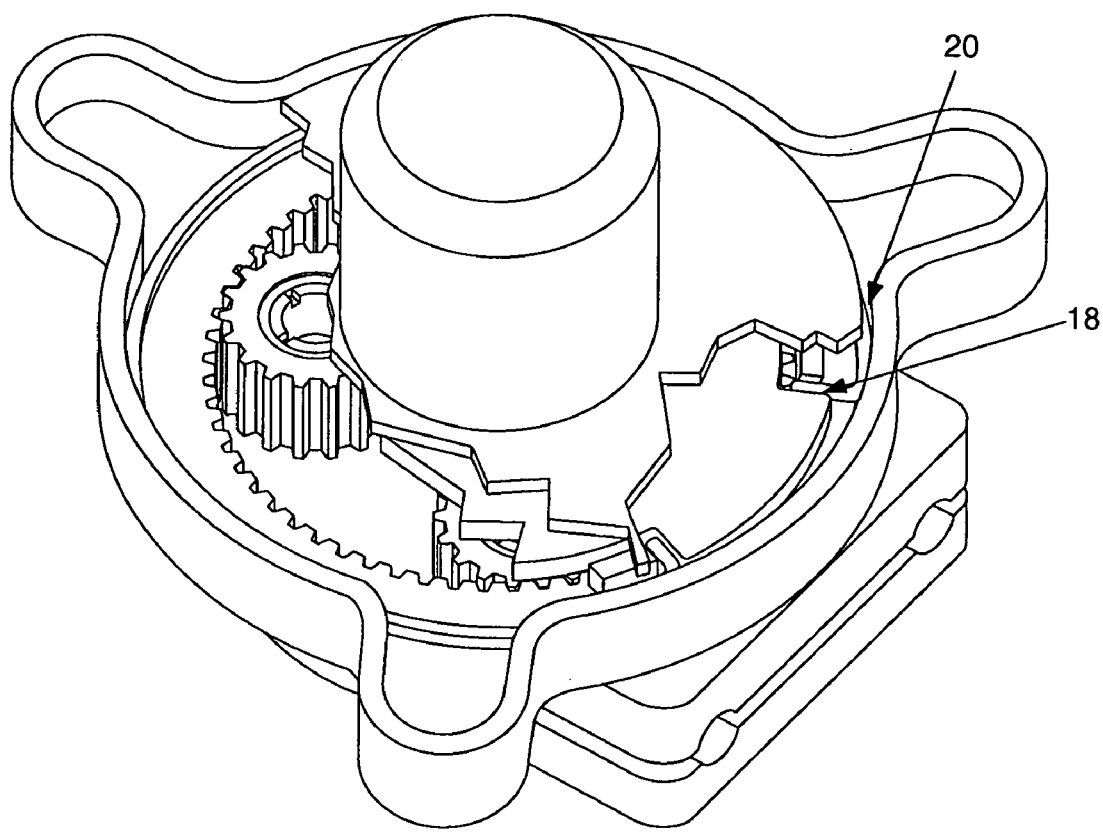
FIG. 2 is an assembled, cut away, perspective view of the planetary gear manual actuator of the present invention.

Referring to the accompanying drawings in which like reference numbers indicate like elements, FIGS. 1 and 2 are perspective views of the planetary gear manual actuator of the present invention. FIG. 1 is exploded and FIG. 2 is assembled and cut away. The housing 10 has attached to it or, in the depicted embodiment, integrally formed as a part of it, Bowden cable sleeve seats 12. A key hole slot 14 allows for assembly of the actuator with a traction cable. The interior of the housing includes a toothed race 16. The recess 20 comprises a seat for a locking spring. In the depicted embodiment, the recess is annular.

A seat for a pulley is substantially on a plane with the Bowden cable sleeve seats 12 and key hole slots 14.

Pulley 30 is dimensioned to fit within the pulley seat in the housing. The pulley has a slot 34 for receiving a traction cable wire (not shown) as the pulley turns to apply traction to the wire. The pulley also has a seat 36 for a traction cable wire end bullet. The faces of this seat will contact the wire end bullet and apply traction to it when the pulley is turned. The pulley also has axles 32 for mounting of planetary gears 40 and for receiving rotational force applied through them. Those with skill in the art will understand that although three planetary gears and planetary gear axles are depicted in this embodiment, any number of planetary gears and planetary gear axles are within the scope of the present invention.

Locking spring 50 has a first end 52 and a second end 54, each of which ends have a tab, bent end or other face for engaging other herein described components of the actuator. Locking spring 50 is dimensioned to seat in close cooperation with recess 20 in housing 10 when the spring is in its relaxed state. That is, the dimensions of the spring and recess 20 are such that there is enough room for the spring to rotate, but insufficient room for the spring to expand. The spring may actually touch the housing seat wall 20 when the spring is still relaxed, provided it can turn when not expanded. More particularly, if ends 52 and 54 were forced apart outside the housing, the overall diameter of spring 50 would enlarge. Inside the housing, though, the recess 20 forestalls expansion of the spring 50 diameter. Accordingly, recess 20 also forestalls a movement tending to separate a first spring end 52 from second spring end 54.

Sun gear disk 60 includes a sun gear 62 and a lever, flange, tab 64 or other element having at least one face for engaging at least one end (52 and/or 54) of spring 50.

Drive shaft 70 includes a hub 72 configured to be assembled with a handle 90 and, in operation, to receive rotational driving force through a users turning of the handle 90. The drive shaft axle 74 proceeds downward and through a central hole 66 in the sun gear disk 60. In the depicted embodiment, drive shaft axle 74 includes a key rail 76 configured to fit into a key slot (not shown) in hole 66 and to apply driving force to sun gear disk 60 via its engagement with sun gear disk hole 66. Drive shaft 70 also has a disk 78. The disk 78 includes first and second and tabs of flanges 80 disposed to straddle lever 64, when assembled, and abut and engage ends 52 and/or 54 of spring 50.

The housing top 88 has mounting ears 86 for receiving pins or screws 92. Pins, screws, rivets or other known fixation devices are used to attach the housing top 88 to housing 10 and thereby encapsulate the other operative components within the assembled actuator in functional relationship to one another. In assembly, handle 90 is inserted through a central hole in the housing top 88 to receive its friction fit with drive shaft hub 72.

To be assembled with a traction cable, (not shown) the traction cable sleeve is mounted on sleeve seat 12 and the traction cable wire is extended and fit through a key hole slot 14 so that the wire end bullet may be placed in wire end bullet seat 36 such that the wire may be received into pulley slot 34. This is done after assembly of the actuator components 10-90.

During assembly with an ergonomic support, traction cable will be mounted on the ergonomic support when the ergonomic support is in a rest position. At the actuator, the Bowden cable wire end bullet will be mounted with both the locking spring 50 and the lumbar support in a rest or untensioned position.

The planetary gears 40 are mounted on axles 32 to engage with toothed race 16. Thereafter spring 50 is seated in recess 20. The sun gear disk 60 is installed on top of this assembly so that sun gear 62 engages planetary gears 40. Also, sun gear lever 64 is disposed between the ends 52 and 54 of spring 50. The drive shaft axle 74 is inserted into the sun gear disk 60. The drive shaft disk 78 is disposed such that tabs 80 descend downward into the plane occupied by the sun gear lever 64 and spring 50. Whether aligned by a key (76) or not, tabs 80 straddle the lever 64 and ends 52 and 54 of the spring 50. In this manner, each end 52 and 54 of spring 50 is sandwiched between a side face of lever 64 and one of the tabs 80, in close cooperation with them and with a small amount of tolerance. Assembly is completed by screwing the housing top 80 on the housing bottom 10 and installing lever 90.

As can be seen, the actuator as a whole and the traction cable mounting aspects of it are bilateral and symmetrical. Accordingly, the actuator may be used an either right or left handed seating, may be used for differing ergonomic supports on the right or left hand side of the same seat or may for any other reason receive mounting of a single traction cable on either side of housing 10. A unilateral version with only one tab 80 is within the scope of the present invention.

In operation, a user will adjust the ergonomic support, for example a lumbar support, from a rest position to a selected position by turning handle 90. Turning handle 90 turns drive shaft 70, which turns sun gear 62. The sun gear's engagement with planetary gears 40 causes them to rotate in an encapsulated path defined by the toothed race 16. Planetary gears 40 will in turn move in a circular path, causing pulley 30 to rotate. The rotation of pulley 30 in a first direction will apply tension to draw a traction cable wire out of a traction cable sleeve, causing a corresponding traction at the other end of the traction cable to actuate an ergonomic support. The depicted embodiment has a gear ratio of 4.3 to 1, whereby the pulley 30 turns once for 4.3 turns of the handle 90. Three handle turns would yield 230° of pulley turn, corresponding to a traction cable range of travel of about 30 to about 50 millimeters, which is a common range of travel for auto seat ergonomic supports. This gear ration imparts a desirable ease of use to the actuator.

As the sun gear rotates to bring an ergonomic support into a selected position, the lever 64 and disk 78 rotate. Because the ends 52 and 54 of spring 50 are adjacent to lever 64, the spring 50 will rotate in unison with the sun gear disk 66 and the drive axle disk 78. As rotation continues, tension increases on the traction cable and tends to pull pulley 30 tangentially back towards its original position. When the user releases handle 90, in a selected position, this tractive force on the wire and counter rotational force on the pulley will need to be resisted if the selected position is to be held. After a users release, this force will be transferred through the planetary and sun gears to sun gear disk 66 and its lever 64. This force will be exerted by lever 64 on the spring end closest to the neutral position, which in the depicted embodiment is spring end 52. However, such a force on spring end 52 will tend to cause an expansion of the spring 50. As described earlier, expansion of spring 50 is arrested by the housing wall in circumference around recess 20. The counter rotational force of the wire that expands the spring holds it in a friction fit with the housing seat. The device locks in the selected position.

The opposite spring end, 54 in the depicted embodiment, is not also pushed in a counter rotating direction by the tab 80 because a small amount of play or space is dimensioned between them. This space, although remaining quite small, is slightly larger than the amount of circumferential space necessary to move spring 50 into locking engagement with recess wall 20. The locking effect of spring 50's expansion against the recess wall 20 correspondingly holds lever 60 in place and prevents its counter rotation. Accordingly, sun gear 62, planetary gears 40 and pulley 30 are all prevented from counter rotation. Thus, the user selected position is held in place against the tension on the traction wire being exerted in a returning or counter rotational direction.

To release the selected position and return to a home position, the drive shaft is turned in the opposite direction. Release tab 80 then closes the small space between itself and spring end 52 or 54, and pushes it. This contracts spring 50, releasing it from locking engagement with spring seat wall 20, so that the spring can counter rotate towards the home position in conjunction with lever 64 and disk 78.

Figure 3:
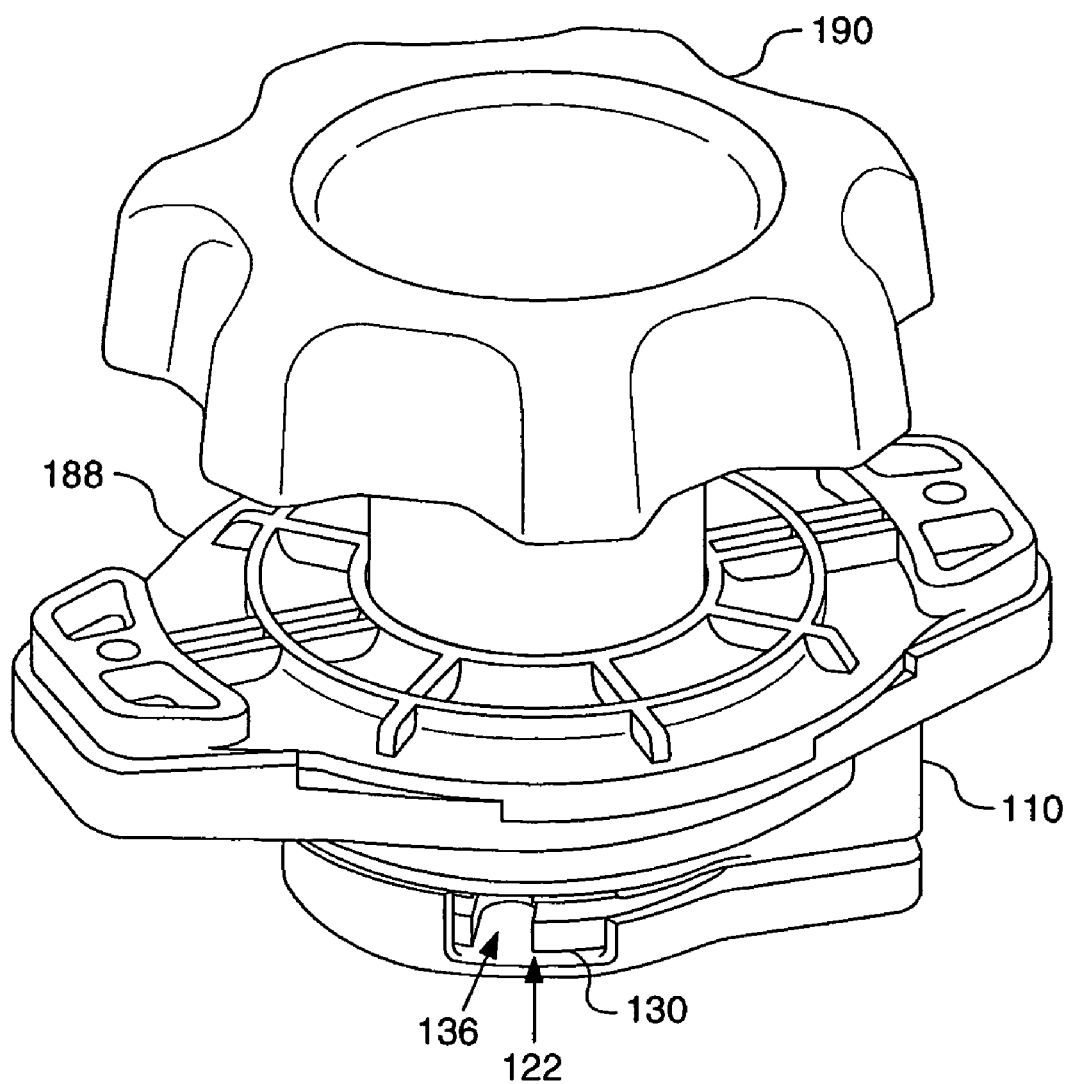
FIG. 3 is a perspective view of an assembled actuator.

FIG. 3 depicts an assembled alternative embodiment of the planetary gear actuator. As can be seen through key hole slot 122 in lower housing part 110, the pulley 130 and its wire end bullet seat 136 are visible and accessible for assembly with a traction cable. The upper housing component 188, has ribbing molded into it for increased strength.

Figure 4:
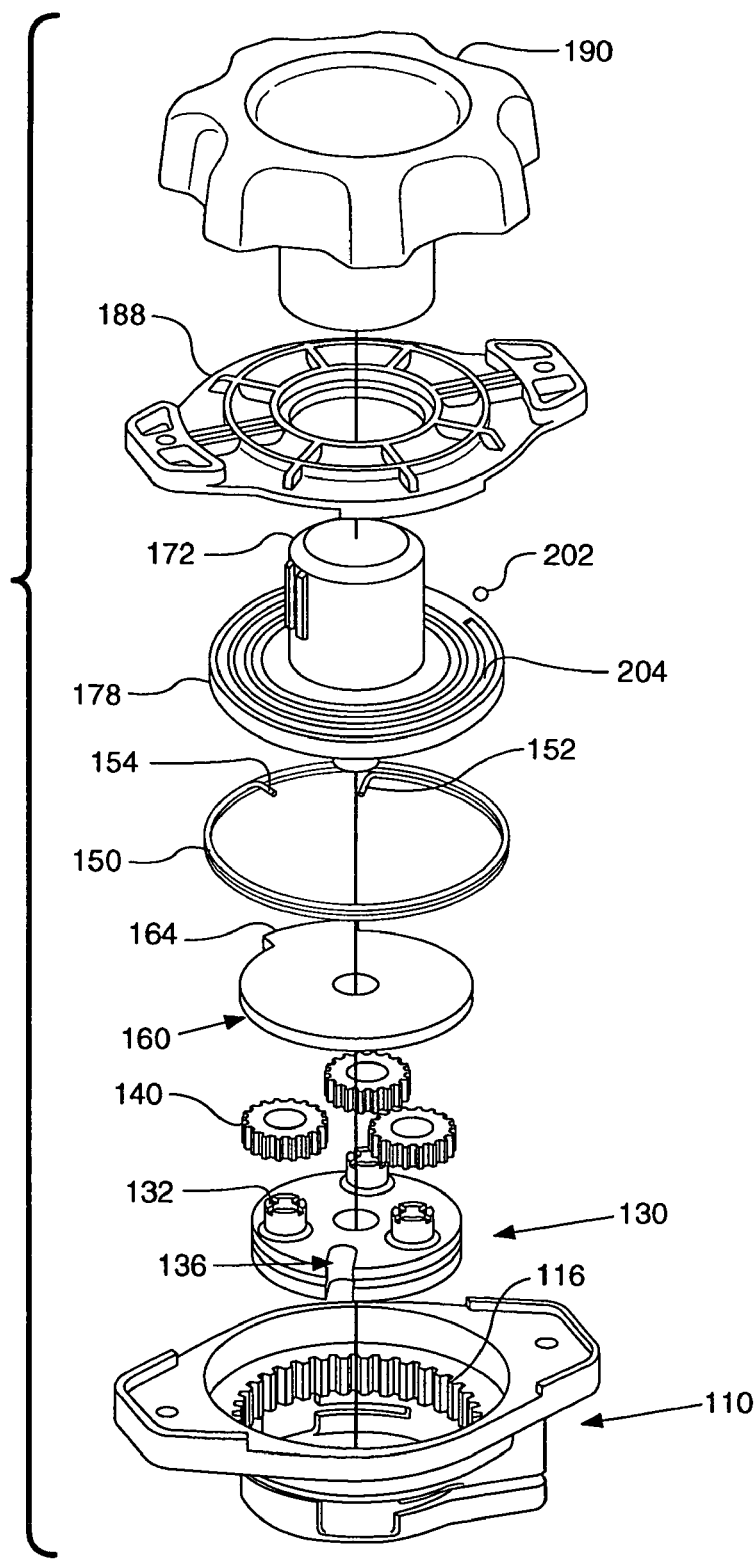
FIG. 4 is an exploded view of an alternative embodiment of the actuator.
Figure 5:
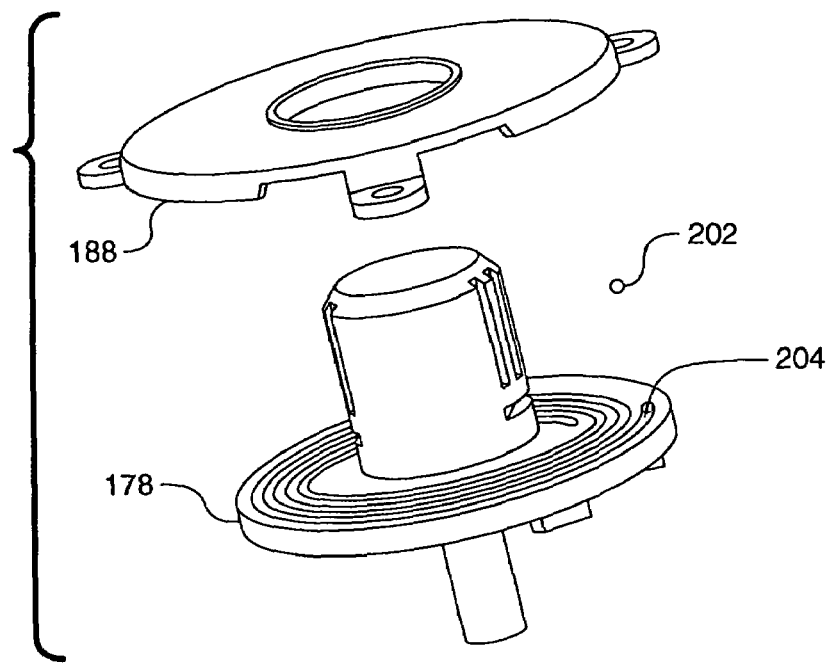
FIG. 5 is an exploded perspective view of the positive stop feature of the alternative embodiment.

FIG. 4 depicts an exploded view of alternative embodiment of the actuator in the present invention. Components 110 through 154, 172, 178, 188 and 190 all correspond to the equivalent components 10 through 54, etc. in FIGS. 1 and 2. Their configuration, assembly, function and operation are the same. Disk 178 also has tabs on its underside for engaging spring end 152 and 154, however from the perspective of FIG. 4 they are obscured by the top of disk 178. FIGS. 4, 5, 6 and 7, also disclose a further novel feature of the present invention. It is a positive stop mechanism comprised of a spiral or helical groove 204 in which is disposed a ball bearing or other traveling component 202. When assembled, bearing 202 is held in groove 204 by the sandwich assembly of disk 178 with a housing top 188. Component 202 may be a convexity in top element 188, on its bottom side.

As described above, several turns of the actuator may be required to move an ergonomic support through its entire range of motion, as in most anticipated installations of the present invention. At either terminal end of the ergonomic support's range of motion, continued turning of the handle 190 by a user may lead to unnecessary stress and tension on the components, and possibly an imprecise feel to the users touch. A positive stop incorporated in the actuator itself eliminates those effects. Accordingly, in the depicted embodiment, the number of turns (3) of the spiral groove 204 correspond to the number of turns of the hand crank 190 required to take the ergonomic support anticipated to be actuated by the present invention through its entire range of motion. Other degrees of rotation of the spiral groove, other groove configurations and other ranges of travel are within the scope of the present invention.

Such positive stop, when used with a high speed gear train such as the planetary gear, will reduce the load in the gear train. As an example of this protective capacity, the depicted embodiment has a gear ratio between the sun gear and pulley of 4.33 to 1. This means that the torque received at the pulley (30, 130) is 4.33 times that applied to handle (90, 190). For the depicted manual system, the minimal requirement for this torque 8 Nm. The presently depicted planetary gear train would amplify this to 34.64 Nm (4.33 times 8). When the components are made of plastic, that load is sufficient to damage each of the components if applied after the end of a range of travel is reached. The positive stop depicted in FIGS. 4-7, prevents this magnified load from being applied to the subsequent portion of the gear train, and leaves them under the stress of only the ergonomic support, as they are designed to withstand.

The positive stop system comprised of bearing 202 and groove 204 in the top surface of disk 178 may also be applied for actuators powered by electric motors. Alternatively, the groove may be in the bottom surface of a top element, e.g. 188, engaged with a top surface of a bottom element, e.g. 178. Again, the effect of these is to reduce the load on the components and increase their durability and prolong their usable lifetime.

Figure 6:
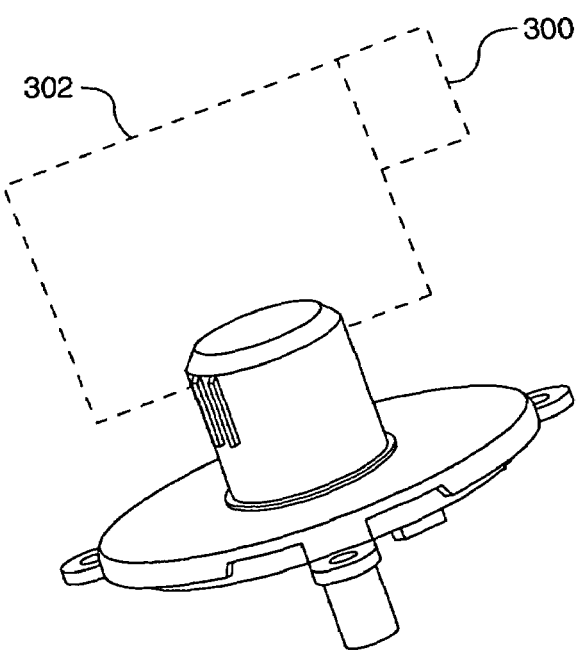
FIG. 6 is a perspective view of the positive stop.
Figure 7:
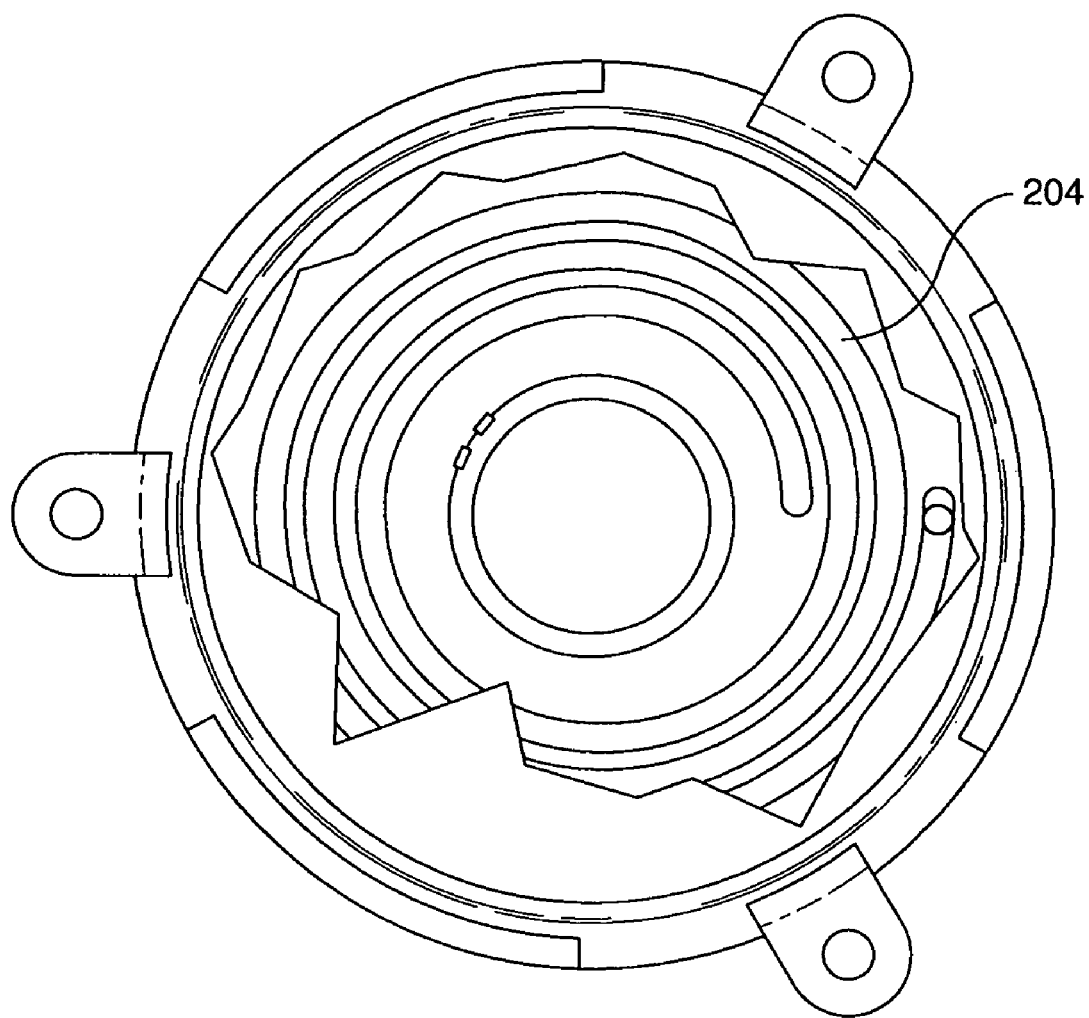
FIG. 7 is a perspective view of the positive stop.

The positive stop feature may be incorporated with other actuators, especially rotational and/or coaxial pulley type actuators. The stop feature may be used with electric motors used as force actuators. FIG. 6 schematically depicts an electric motor 300 and motor housing and geared transfer assembly 302, which are conventional features in known actuators.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A traction cable brake for an ergonomic device adapted for maintaining a position against a load, the load presenting to the brake as traction on the traction cable; said traction cable brake comprising:

a rotating member, said rotating member having a mount for seating a traction cable wire, said wire, when under a load, biasing said rotating member in a first rotational direction;

a housing, said rotating member being mounted in said housing;

an axle, said axle being adapted for seating a manual drive handle;

said axle being operatively engaged with said rotating member, such that a rotational force on said axle turns said rotating member in a said first rotational direction or in a second rotational direction;

a spring, said spring having a first extension and second extension and said spring having an unloaded diameter and a loaded diameter;

a spring seat, said spring seat being operatively engaged with said rotating member, said spring seat being dimensioned to receive said spring, said spring seat having an outer surface;

a braking surface on one of said housing or said spring seat, said braking surface being dimensioned to closely cooperate with said spring;

a braking face, said braking face being in operative engagement with said rotating member such that when said rotating member moves in said first rotational direction, said braking face pushes said first extension of said spring in said first rotational direction, thereby moving said spring to said loaded diameter, said loaded diameter being brakingly engaged with said braking surface; and a releasing face, said releasing face being operatively engaged with a pulley and said releasing face being in operative engagement with said second extension of said spring such that when said axle is engaged to move said rotating member in said second rotational direction, said engagement of said releasing face moves said spring to said unloaded diameter, thereby releasing said spring from said braking engagement with said braking surface.

2. The traction cable brake of claim 1 further comprising:

a driving face, said driving face being operatively engaged with said axle such that when said axle is engaged to turn said rotating member in said second rotational direction, said driving face is operatively engaged with said first extension of said spring to move said spring to said unloaded diameter, thereby releasing said spring from said braking engagement with said braking surface, such that said axle may drive said rotating member in said second rotational direction.

3. The brake of claim 1 further comprising a stop, said stop establishing a rotation limit for said axle.

4. The brake of claim 1 further comprising a stop, said stop establishing a rotation limit for said rotational member.

5. The brake of claim 3 wherein said stop is integrally formed in said housing.

6. The brake of claim 4 wherein said stop is integrally formed with a portion of said housing.

7. The brake of claim 1 wherein said spring has an outermost radius that is less than or equal to the radius of said rotating member at said mount for seating a traction cable wire.

8. The brake of claim 1 including an integrally formed component, a portion of said integrally formed component comprising said axle and a separate portion of said integrally formed component comprising said releasing face.

9. The brake of claim 8 wherein said integrally formed component includes a portion comprising a second releasing face.

10. The brake of claim 2 including an integrally formed component, a portion of said integrally formed component comprising said axle and another portion of said integrally formed component comprising said driving face.

11. The brake of claim 1 including an integrally formed component, a portion of said component comprising said axle, a second portion of said integrally formed component comprising said releasing face and a third portion of said integrally formed component comprising a driving face, said driving face being operatively engaged with said rotating member, said driving face being operatively engaged with said first tab of said spring to move said spring to said unloaded diameter, thereby releasing said spring from braking engagement with one of said outer surface of said spring seat or said housing, such that said axle may drive said rotating member in said second rotational direction.

12. The brake of claim 1 wherein said rotating member and said spring are coaxial.

13. The brake of claim 1 wherein said rotating member and said axle are coaxial.

14. The brake of claim 1 wherein said release face and said braking face define an angular space therebetween, said angular space having an angular dimension greater than a width of said extension of said spring.

15. The brake of claim 14 wherein said angular space exists when said spring is in said braking engagement.

16. The brake of claim 14 wherein said angular space does not exist when said releasing face is in said operative engagement with said second extension of said spring.

17. The brake of claim 2 wherein said driving face and said braking face define an angular space therebetween, said angular space having an angular dimension greater than a width of one of said extensions of said spring.

18. The brake of claim 17 wherein said angular space does not exist when said rotational member is being driven by said driving face.

19. The brake of claim 1 wherein said spring is a coil spring.

20. A traction cable brake for an ergonomic device adapted for maintaining a position against a load, the load presenting to the brake as traction on the traction cable; said traction cable brake comprising:

a rotating member, said rotating member having a mount for seating a traction cable wire, said wire, when under a load, biasing said rotating member in a first rotational direction;

a housing, said rotating member being mounted in said housing;

a lever mount, said lever mount being adapted for seating a lever;

a linkage between said lever mount and said rotating member, said linkage transferring a force on said lever mount to turn said rotating member in a said first rotational direction or in a second rotational direction;

a coil spring, said coil spring having a first tab and second tab and said coil spring having an unloaded diameter and a loaded diameter;

a spring seat on said linkage, said spring seat being dimensioned to receive said coil spring, said spring seat having an outer surface;

an encapsulating surface on one of said housing or said linkage, said encapsulating surface being dimensioned to closely cooperate with said coil spring;

a braking face, said braking face being in operative engagement with said rotating member such that when said rotating member moves in said first rotational direction, said braking face pushes said first tab of said coil spring in said first rotational direction, thereby moving said coil spring to said loaded diameter, said loaded diameter being brakingly engaged with one of said outer surface of said spring seat or said encapsulating surface; and a releasing face, said releasing face being on said linkage and said releasing face being in operative engagement with said second tab of said coil spring such that when said lever mount is engaged to move said rotational member in said second rotational direction, said engagement of said releasing face moves said coil spring to said unloaded diameter, thereby releasing said coil spring from braking engagement with said one of said outer surface of said spring seat or said encapsulated surface.

* * * * *